FIG.I.

July 8, 1958 H. S. RAINBOW 2,841,954
MEANS FOR REVERSING THE THRUST OF A JET ENGINE
Filed Dec. 13, 1955 5 Sheets-Sheet 4

INVENTOR
H. S. RAINBOW

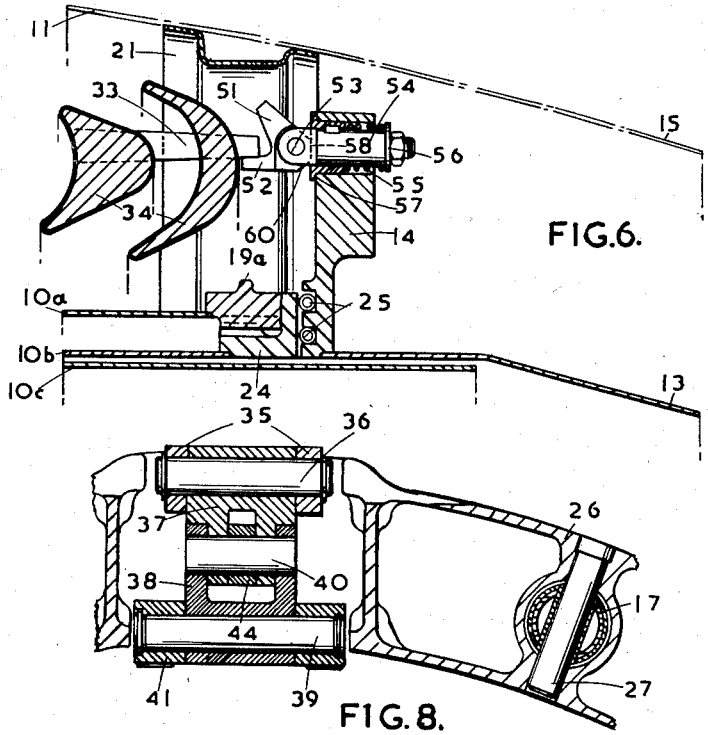
FIG.6.
FIG.8.
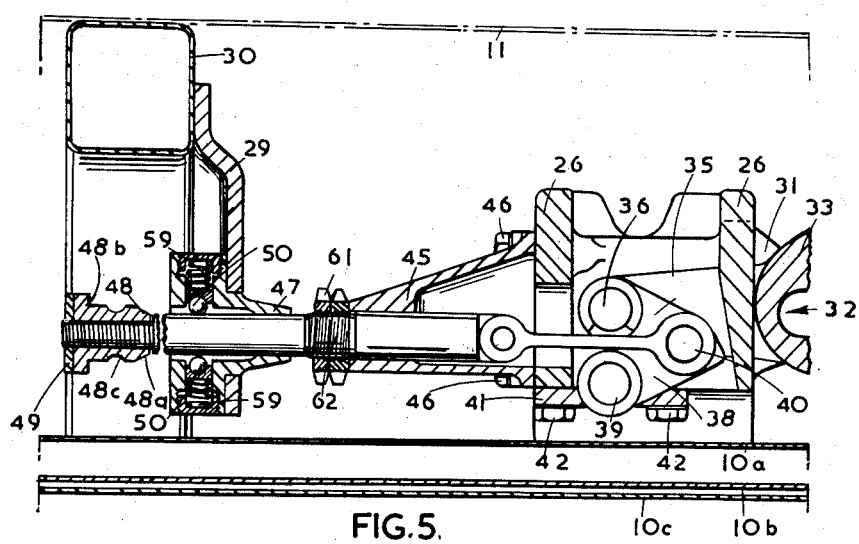
FIG.5.
INVENTOR
H. S. RAINBOW

United States Patent Office 2,841,954
Patented July 8, 1958

2,841,954

MEANS FOR REVERSING THE THRUST OF A JET ENGINE

Horace S. Rainbow, Coventry, England, assignor to Armstrong Siddeley Motors Limited, Coventry, England Application December 13, 1955, Serial No. 552,948

Claims priority, application Great Britain December 23, 1954

5 Claims. (Cl. 60—35.54)

This invention relates to a jet engine for propelling an aircraft.

The main object of the invention is to provide improved means for reversing the thrust of the propulsion jet—for example, for aircraft braking purposes.

According to the invention, the nozzle at the tail end of the jet pipe (hereinafter referred to as the jet nozzle) is movable from its operative position to a position in which it is substantially inoperative, the engine being provided with a number of movable, thrust-reversing sections which normally lie in inoperative positions outside the jet pipe, but are movable inwardly towards one another to an operative, thrust-reversing position, when the jet nozzle has been reduced inoperative, so as jointly to provide a conical series of aerofoil-section rings which are shaped so as partially to reverse the direction of flow of a main proportion of the jet.

According to a further feature the nozzle is movable axially downstream (to its inoperative position) and the conical series of aerofoil-section rings which are formed when the thrust-reversal sections are in their operative position, are upstream of the jet nozzle.

Preferably, each of the movable sections tapers in a downstream direction and includes a number of axially-spaced, aerofoil-section segments, the segments being arranged to form with the segments of the other movable sections a series of coaxial, thrust-reversing, annular nozzles.

In the accompanying drawings:

Figure 1 is a side elevation of one form of means according to the invention, the tail end of the jet pipe casing being indicated, in section, by chain lines, and the parts being shown in the normal relative positions;

Figure 2 corresponds with Figure 1 but shows the parts in their relative positions for thrust reversal;

Figure 1:
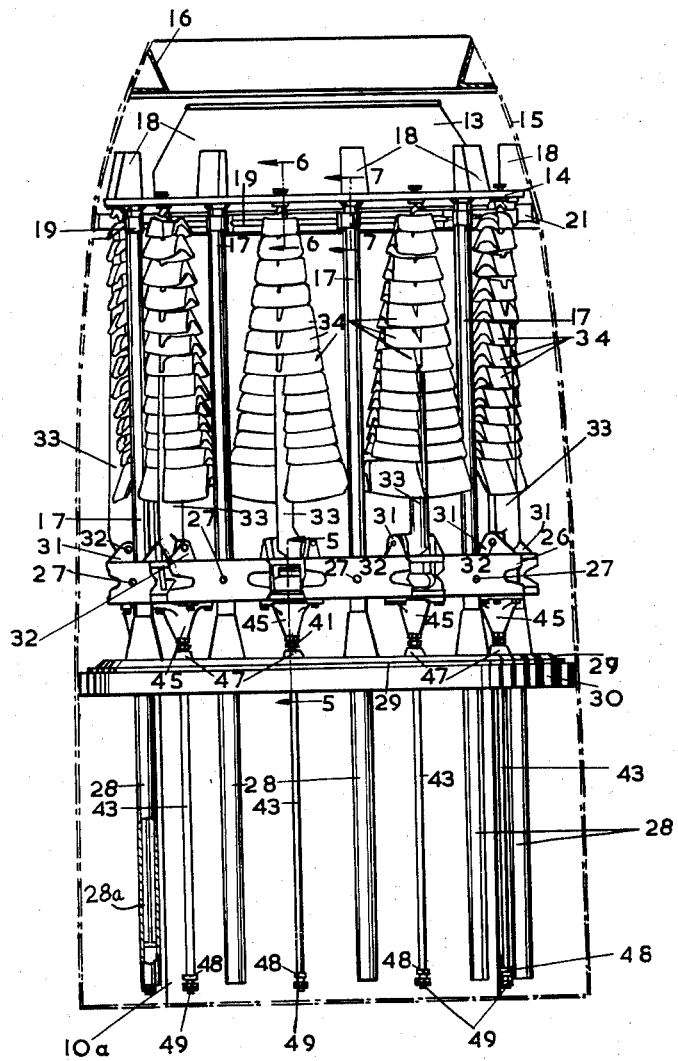
Figure 4:
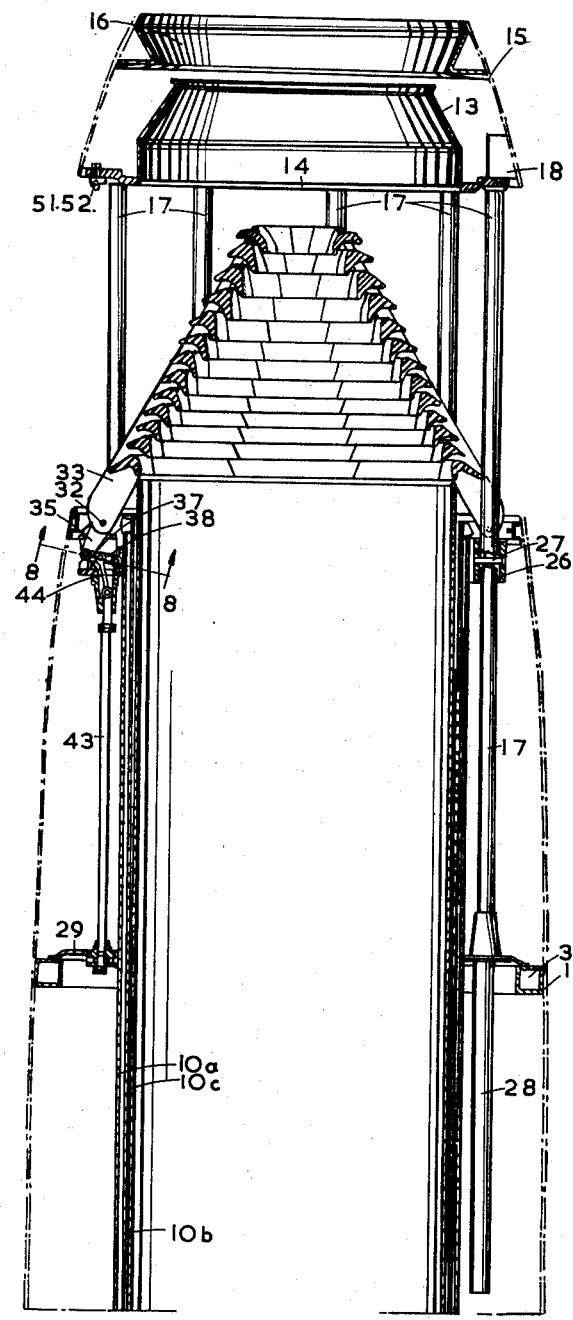
Figure 4 is a longitudinal sectional view corresponding with Figure 2.

Figures 5, 6 and 7 are sectional views, to a larger scale, respectively on the lines 5—5, 6—6 and 7—7 of Figure 1; and Figure 8 is a sectional view, to a larger scale, on the line 8—8 of Figure 4.

In the construction shown, the jet pipe is indicated at 10a, 10b, 10c, its casing (or engine nacelle) at 11, and the jet nozzle at 13.

The jet nozzle is fast with a ring 14 which also carries a coaxial fairing 15 for the casing 11, this fairing having its mouth formed as at 16. Fast in holes of the ring 14 is a circle of axially-extending tubes 17 which extend parallelly into the annular space between the jet pipe portion 10a and the casing 11, and have their downstream ends reduced at 17a (see Figure 7) to be engaged in clamp brackets 18 fast with the fairing 15. These tubes extend slidably through guide bores in radial extensions 19 of a second ring 19a (also see Figure 7) which is fast on the jet pipe portion 10a; and the outer ends of the extensions have aligned peripheral slots in which are received, with thermal-expansion clearance, a circular series of locating lugs 20 carried by an outer ring 21 fast within the casing 11. For making the ring 19a fast with the jet pipe portion 10a it is welded at 22 to the latter, and has an axial tooth engagement 23 with a flanged ring 24 welded to the intermediate component 10b of the jet pipe. The flange of the ring 24 coacts with sealing means 25 of the ring 14, when the jet nozzle is in its normal position, so as to prevent the escape between them of the jet gases within the innermost component 10c, of the jet pipe, which in these conditions extends downstream into the jet nozzle.

In an intermediate position the tubes 17 are made fast with an annular member 26, as by through pins 27; while at their upstream ends they are fast with the movable members 28a of respective, double-acting, hydraulic actuators of which the cylinders are shown at 28. These latter are supported by a ring 29 which, in turn, is fast with a hollow ring 30 secured to the casing 11. It will thus be seen that when the tubes 17 are acted upon by the hydraulic actuators they are guided for accurately moving the jet nozzle, and associated structure, between the positions shown in Figures 1 and 2.

The annular member 26 has a circular series of substantially axially-extending pairs of bearing lugs 31 at its downstream side, these pairs of lugs being centrally spaced between the tubes 17. Each pair of lugs 31 pivotally supports one of the thrust-reversing sections at 32, the pivotal connection being to a longitudinal central beam 33 of the section. The central beam supports a series of axially-spaced segments 34 which are of aerofoil section and are of progressively decreasing length (i. e., circumferentially) from the upstream, to the downstream end of the beam. These segments are also arcuate in the direction of their lengths so that when all of the sections are in the operative position shown in Figure 2 they constitute a conical cascade of aerofoil-section rings which divert substantially the whole of the exhaust gases travelling along the jet pipe to be generally directed somewhat rearwardly through the clearance between the jet pipe and the jet pipe nozzle.

Each of the beams 33 has a bifurcated extension 35 on the opposite side of the pivot 32, and this extension has a pivotal connection 36 with a toggle link 37 (see Figure 5). The coacting toggle link 38 is pivoted at 39 from the annular member 26, and the two toggle links have their common pivot at 40. As shown, the pivot 39 is fast with a bracket 41 which is secured over an opening in the member 26 by screws 42, 42.

A slidable rod 43 is connected by a link 44 to the common toggle pivot 40 and is guided in a housing 45 which is bolted at 46 to the member 26 and which is formed internally to accommodate the angular movement of the link 44 occasioned when the toggle operates. Each rod 43 also extends through a guide 47 secured to the ring 29 and, at its upstream end, is screw-threaded to receive a part 48 with an inclined shoulder 48a at one end and a nut-head 48b at the other end. This part is locked by a lock-nut 49 for adjustably locating a peripheral groove 48c of the part. This groove coacts with spring-pressed balls 50 which are mounted in the guide 47 for a purpose presently to be described.

Figure 2:
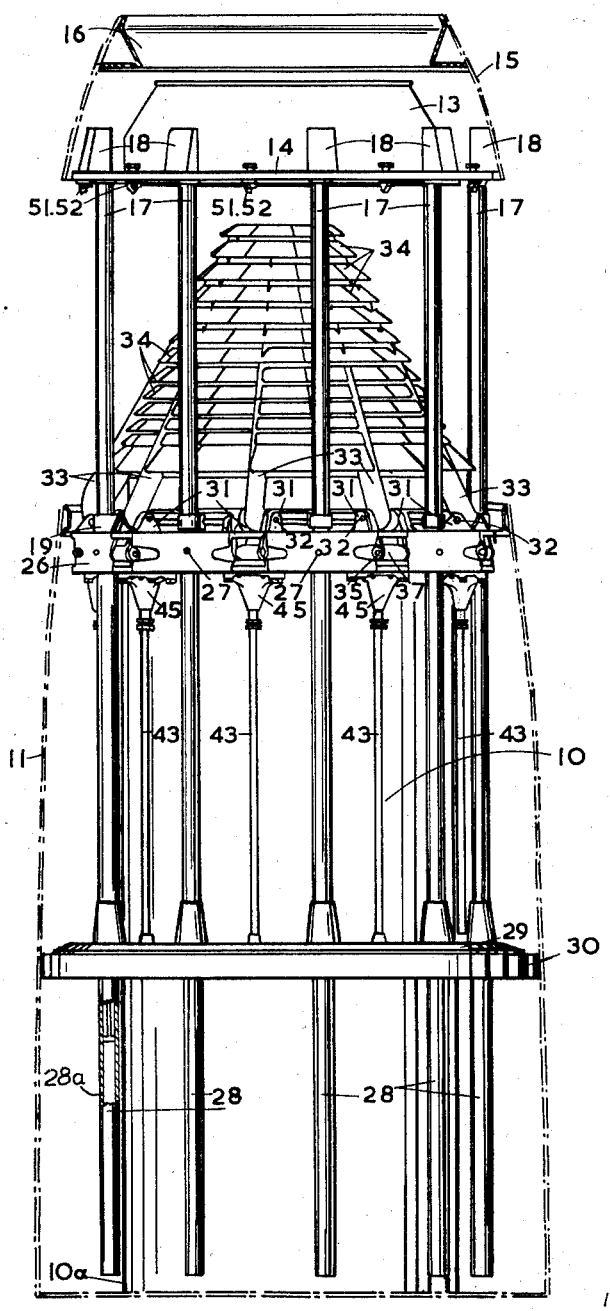
Figure 3:
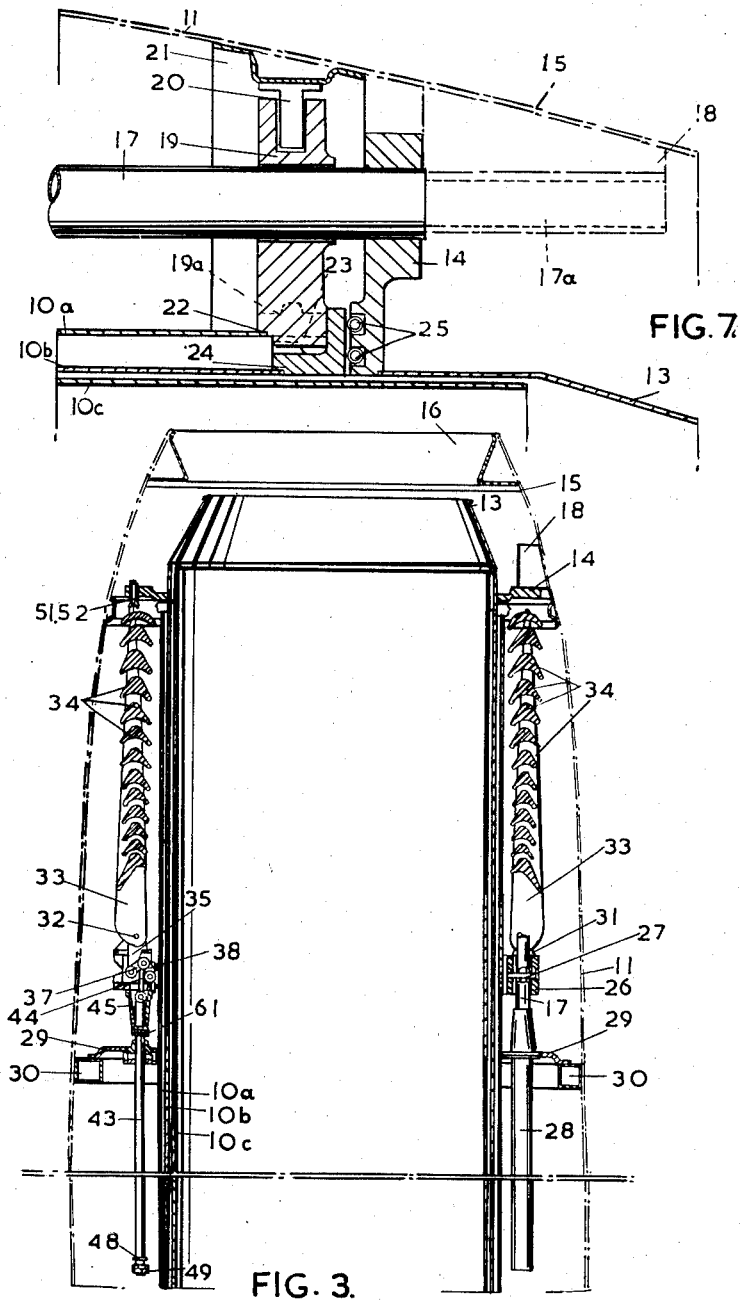
Figure 3 is a longitudinal sectional view corresponding with Figure 1.

Starting with the parts in the relative positions shown in Figure 1 (i. e., with the jet pipe functioning normally), operation of the hydraulic actuators extends the tubes 17 to carry the jet nozzle 13 and fairing 15 to the position shown in Figure 2. During this movement the annular member 26 is carried rearwardly as well, and carries with it the beams 33 of the thrust-reversing sections. During the initial part of this movement the beams 33 are held parallel by their downstream ends, each being engaged between the arms 51, 52 of a fork which is pivoted at 53 in a jaw at one end of a plunger 54 (see Figure 6). A spring 55 reacting between an adjustable abutment 56 on the plunger and the inner end of a ferrule 57 screwthreaded into the ring 14, holds the arms 51 and 52 in the position shown in Figure 6, in which position they are lightly located by the engagement of a flat 58 with a ferrule. As the said movement progresses, the shoulders 48a of the parts 48 on the rods 43 (which are also being moved by the annular member 26) depress the balls 50 against their springs 59 (with the result that the balls snap into the grooves) and the nut heads 48b abut the adjacent end faces of the guides 47 so as to arrest the rods 43. This allows the continued movement of the annular member 26 to cause the toggle-links 37 and 38 to open with the result that a radially-outward force, of progressively increasing mechanical advantage, is applied to the extensions 35 of the beams 33, whereby the latter are tilted radially-inwardly about their pivots 32. At the beginning of this tilting movement the downstream ends of the beams turn the fork arms 51 and 52 against the effort of the spring 55 into a releasing position (in which latter they are lightly held by a second flat 60 engaging the ferrule), while the residue of the tilting movement moves the sections into an operative position intermediate the jet pipe and the jet nozzle as shown in Figure 2. In this position the sections mate to form a conical series, or cascade, axially-spaced aerofoil-section rings composed of the aerofoil segments 34 (which, it will be remembered, are arcuate in the circumferential direction) and the toggle links 37, 38 will have moved to an in-line position to hold the sections against the thrust of the jet.

The hydraulic actuators are reversely operated for moving the parts back to their normal positions (i. e., from the position of Figure 2 to that of Figure 1), and during the initial return movement of the annular member 26 the balls 50 hold the rods 43 for allowing the toggle links 37 and 38 to fold back to the position shown in Figure 5. This, assisted by the thrust of the gases in the jet pipe, allows the sections to swing radially-outwardly until the downstream ends of the beams encounter the form arms 51 to tilt the forks back to the position in Figure 6, in which the beams 33 are again substantially parallel and held against further radially-outward movement. When the toggle links have fully resumed their folded positions the further return movement of the annular member 26 exerts a direct thrust on the rods 43 through the housings 45 abutting a pair of lock-nuts 61 (see Figure 5) adjustably fast on a screw-threaded portion 62 of the rods, and disengages the balls from the grooves 48c. Continued reverse movement of the said annular member returns the parts to the positions shown in Figure 1.

The sections can have laterally-extending dowel pins and dowel holes arranged on, say, the most upstream segments, so that, during their tilting movement to the position shown in Figure 2, the dowel pins engage the holes so as to guide the sections accurately into correct relative positions.

With a thrust reversal device according to the invention it is desirable first to throttle the engine to idling speed before rendering the nozzle inoperative so as to enable relatively light actuating forces and actuating means to be employed for moving the thrust reversal device into operative position. During the short interim period between rendering the nozzle inoperative and the thrust reversal device operative, the engine would tend to overspeed and start to surge when the device was brought into operation; but this would be prevented by the engine governor appropriately reducing the fuel supply at the commencement of this period, and restoring it when the thrust reversal device is in its operative position — after which the throttle can be opened to any desired degree.

What I claim as my invention and desire to secure by Letters Patent of the United States is:

1. A jet engine including a jet pipe, a jet nozzle at the tail end of said jet pipe, means connected to said jet nozzle for moving the same to a position in which it is substantially inoperative, more than two thrust-reversing sections which normally lie in inoperative positions outside said jet pipe, each of said sections being provided with a series of arcuate thrust-reversing elements, a carrier for said sections, a connection between said carrier and said means for moving said jet nozzle, so that said sections extend beyond the downstream end of said jet pipe when said jet nozzle is in its inoperative position, and means for moving said sections inwardly towards one another for their said elements jointly to provide a conical series of aerofoil-section rings which lie upstream of the jet nozzle and are shaped to reverse the thrust of flow of a main proportion of the jet.

2. A jet engine including a jet pipe, a jet nozzle at the tail end of said jet pipe, means connected to said jet nozzle for moving the same axially to a position downstream of said jet pipe, more than two thrust-reversing sections which normally lie in inoperative positions outside said jet pipe, each of said sections being provided with a series of arcuate thrust-reversing elements, a carrier for said sections, said sections pivoted on said carrier for tilting in respective radial planes of said jet pipe, a connection between said carrier and said means for axially moving said jet nozzle so that said sections will extend beyond the downstream end of said jet pipe when said jet nozzle is in its downstream position, and means for simultaneously tilting said sections inwardly about their pivots so that said elements jointly provide a conical series of aerofoil-section rings intermediate the adjacent ends of said jet pipe and jet nozzle when the latter is in its downstream position, said aerofoil-section rings being shaped to reverse the thrust of flow of a main proportion of the jet.

3. A jet engine, according to claim 2, in which the thrust-reversing elements of the sections are in the form of transversely arranged aerofoil-section segments, the segments being of progressively shorter lengths from the region of the pivotal connections to the carrier to the downstream end of the sections whereby the latter taper in the downstream direction, said segments of adjacent sections respectively meeting end to end when said sections are in their operative positions so that said segments jointly form a conical cascade of thrust-reversing nozzles.

4. A jet engine including a jet pipe, a jet nozzle at the tail end of said jet pipe, circular arrangements of guides outside said jet pipe, a circular arrangement of parallel tubes supported in said guides and connected at their downstream end with said jet nozzle, respective, double-acting, hydraulic actuators at the upstream ends of said tubes for reversely moving said jet nozzle between its operative position and a position axially downstream of said jet pipe in which said jet nozzle is substantially inoperative, more than two arcuate thrust-reversing sections which normally lie in inoperative positions outside said jet pipe with their axes parallel thereto, each of said sections being provided with a series of arcuate thrust-reversing elements, a carrier for said sections, said sections being pivoted on said carrier adjacent the upstream ends thereof for tilting in respective radial planes of said jet pipe, respective toggle means acting between said carrier and said sections remotely from the pivots of said sections on said carrier, said carrier being rigid with said tubes, and means operating, when said sections have been moved by said tubes to extend beyond the downstream end of said jet pipe, to extend said toggles for simultaneously tilting said sections inwardly about their pivots for their said elements to jointly provide a conical series of aerofoil-section rings intermediate the adjacent ends of said jet pipe and jet nozzle when the latter is in its downstream position, said aerofoil-section rings being shaped to reverse the thrust of flow of a main proportion of the jet.

5. A jet engine, according to claim 4, in which the means operating to extend the toggles comprise respective rods connected by respective links to the common pivots of the respective toggles, abutment means arresting said rods during the final portion of the downstream movement of the tubes whereby the said toggles are extended, and resilient means lightly locating said rods in the position in which said toggles are extended whereby, on a return movement of said tubes, said toggles are again folded to operate the sections to their parallel positions before said tubes retract said sections to their normal inoperative position.

References Cited in the file of this patent

UNITED STATES PATENTS 2,620,622     Lundberg _____ Dec. 9, 1952

FOREIGN PATENTS 164,004     Australia _____ Apr. 16, 1953